(12) United States Patent
Benco et al.

(10) Patent No.: US 7,949,329 B2
(45) Date of Patent: May 24, 2011

(54) NETWORK SUPPORT FOR MOBILE HANDSET ANTI-VIRUS PROTECTION

(75) Inventors: David S. Benco, Winfield, IL (US);
Kevin J. Overend, Elmhurst, IL (US);
Baoling S. Sheen, Naperville, FL (US);
Sandra L. True, St. Charles, IL (US);
Kenneth J. Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1012 days.

(21) Appl. No.: 10/739,654

(22) Filed: Dec. 18, 2003

(65) Prior Publication Data
US 2005/0138395 A1  Jun. 23, 2005

(51) Int. Cl.
*H04M 3/16* (2006.01)
*H04M 3/42* (2006.01)
*G06F 11/00* (2006.01)

(52) U.S. Cl. .................. 455/414.1; 455/410; 726/24
(58) Field of Classification Search .................. 455/410, 455/414.1, 423, 67.11; 726/22–25; 713/188
See application file for complete search history.

(56) References Cited

U.S. PATENT DOCUMENTS

| | | | | |
|---|---|---|---|---|
| 7,146,155 | B2 * | 12/2006 | Kouznetsov | 455/410 |
| 2002/0042886 | A1 * | 4/2002 | Lahti et al. | 713/201 |
| 2002/0132607 | A1 * | 9/2002 | Castell et al. | 455/412 |
| 2002/0194506 | A1 * | 12/2002 | Wiley et al. | 713/201 |
| 2003/0021280 | A1 * | 1/2003 | Makinson et al. | 370/401 |
| 2003/0074581 | A1 * | 4/2003 | Hursey et al. | 713/201 |
| 2003/0084321 | A1 * | 5/2003 | Tarquini et al. | 713/200 |
| 2003/0140250 | A1 * | 7/2003 | Taninaka et al. | 713/201 |
| 2004/0127195 | A1 * | 7/2004 | An | 455/410 |
| 2005/0064859 | A1 * | 3/2005 | Kotzin et al. | 455/419 |

* cited by examiner

*Primary Examiner* — George Eng
*Assistant Examiner* — Nam Huynh
(74) *Attorney, Agent, or Firm* — Carmen Patti Law Group, LLC

(57) ABSTRACT

Embodiments of the method and system provide network support for automatic anti-virus protection by a telecommunication network for mobile terminals. The method may have the steps of: storing in the telecommunication network at least one anti-virus protection level for at least one mobile terminal; initiating, by the telecommunication network, a call setup for a call associated with the mobile terminal, the call having a data stream; using, by the communication network, the at least one anti-virus protection level to recognize a virus in the data stream intended for the mobile handset; and filtering, by the network, the recognized virus from the data stream before the data stream arrives at the mobile terminal. The system implements the method.

18 Claims, 4 Drawing Sheets

NETWORK SUPPORT FOR MOBILE HANDSET ANTI-VIRUS PROTECTION

TECHNICAL FIELD

The present invention relates to wireless telephony in general, and, more particularly, to a method and system that provides network support for automatic anti-virus protection for mobile terminals.

BACKGROUND OF THE INVENTION

It is well known that computer data viruses represent a potentially serious liability to all computer users and especially to those who regularly transfer data between computers. Modern mobile terminals, such as cell phones and personal data assistants (PDA), are capable of data transfers and connecting to the Internet.

Computer viruses were first identified in the 1980's, and up until the mid-1990s consisted of a piece of executable code which attached itself to a bona fide computer program. At that time, a virus typically inserted a JUMP instruction into the start of the program which, when the program was executed, caused a jump to occur to the "active" part of the virus. In many cases, the viruses were inert and activation of a virus merely resulted in its being spread to other bona fide programs. In other cases however, activation of a virus could cause malfunctioning of the computer running the program including, in extreme cases, the crashing of the computer and the loss of data.

Computer software intended to detect (and in some cases disinfect) infected programs has in general relied as a first step upon identifying those data files which contain executable code, e.g. .exe, .com, .bat. Once identified, these files are searched (or parsed) for certain signatures, which are associated with known viruses. The producers of anti-virus software maintain up to date records of such signatures, which may be, for example, checksums.

Computer viruses travel between machines via infected media or over network connections disguised as legitimate files or messages. The earliest computer viruses infected boot sectors and files. Over time, computer viruses evolved into numerous forms and types, including cavity, cluster, companion, direct action, encrypting, multipartite, mutating, polymorphic, overwriting, self-garbling, and stealth viruses. Most recently, macro viruses have become increasingly popular. These viruses are written in macro programming languages and are attached to document templates or as electronic mail attachments.

Historically, anti-virus solutions have reflected the sophistication of the viruses being combated. The first anti-virus solutions were stand-alone programs for identifying and disabling viruses. Eventually, anti-virus solutions grew to include specialized functions and parameterized variables that could be stored in a data file. During operation, an anti-virus engine operating on a client computer read the data file. Finally, the specialized functions evolved into full-fledged anti-virus languages for defining virus scanning and cleaning, including removal and disablement, instructions.

The growth of communication systems has resulted in increased system capacity and flexibility. Early cellular communication systems provided services using circuit-switched technologies. Now, however, mobile calls may be routed in a circuit-switched fashion, a packet-switched fashion, or some hybrid thereof. Moreover, it has become increasingly desirable to couple and integrate mobile cellular telephone networks, for instance a GSM network, to Internet protocol (IP) networks for call routing purposes. The routing of voice calls over IP networks is frequently termed "voice over IP" (VoIP).

Mobile subscribers are becoming increasingly connected to the public data networks via their mobile terminals (also referred to as mobile handsets, cell phones, personal data assistants, etc.). As mobile telephone applications become more powerful and sophisticated, the likelihood of exposure to computer viruses increases. As in the case of desktop and laptop computers, capabilities put in place for the convenience of the user can be subverted to work against the user. One example of a mobile handset virus is a virus that erases the subscriber's internal telephone directory.

For successful sales, mobile handsets must be widely perceived as being reliable and largely immune to hacking. Historically, this has been true due to the relatively simple external interfaces to the internal computing capability offered by mobile phones. As the sophistication of handsets and features continues to evolve and the possibility of connecting to the public data network increases, there is a need in the art to protect mobile telephony handsets from virus-like damage and corruption.

Desktop computers and laptops offer anti-virus protection software; however mobile handsets and wireline phones do not yet offer such protection, as their programmable features are presently relatively unsophisticated. Thus, there is a need for a network solution that provides the necessary network support for insuring that data transmissions to mobile terminals contain no malicious instructions and that provides a warning message to the subscriber before allowing certain powerful capabilities to be automatically executed (e.g., full erase of the subscribers phone list, full reset of the mobile configuration, etc.).

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, an embodiment of the present method is a method that provides network support for automatic anti-virus protection by a telecommunication network for mobile terminals. In one embodiment the method may have the steps of: storing in the telecommunication network at least one anti-virus protection level for at least one mobile terminal; initiating, by the telecommunication network, a call setup for a call associated with the mobile terminal, the call having a data stream; using, by the communication network, the at least one anti-virus protection level to recognize a virus in the data stream intended for the mobile handset; and filtering, by the network, the recognized virus from the data stream before the data stream arrives at the mobile terminal.

Also, in general terms, an embodiment of the present system is a system that provides network support for automatic anti-virus protection by a telecommunication network for mobile terminals. In one embodiment the system may have: a mobile subscriber database in the telecommunication network in which is stored at least one anti-virus protection level for at least one mobile terminal in the subscriber database; a call controller in the telecommunication network that handles a call having a data stream, and that implements a call setup for the call, the call being associated with the mobile terminal, the call setup being initiated by the call controller; a retrieving module in the telecommunication network operatively connected to the mobile subscriber database and to the call controller, the retrieving module retrieving the anti-virus protection level from the mobile subscriber database for the mobile terminal and storing the retrieved anti-virus protection level in a memory of the telecommunication system as part of the call setup; a recognition module in the telecommunication network operatively connected to the call controller and to the memory, the recognition module using the retrieved anti-virus protection level stored in the memory to recognize a virus in the data stream intended for the mobile terminal; and a filter module in the telecommunication network operatively connected to the memory and to the call controller, the filter module filtering the recognized virus from the data stream before the data stream arrives at the mobile terminal.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

Methodologies of the present method and system may include at least one of: recognizing malicious instructions (viruses) in software/files downloaded from public data networks or other sources; automatically disabling malicious instructions, based on subscriber preference defined in the anti-virus feature; and automatically prompting the mobile subscriber before passing on potentially harmful instructions to the mobile terminal.

Computer viruses are program code usually causing malicious and often destructive results. All computer viruses are self-replicating. More precisely, computer viruses include any form of self-replicating computer code which can be stored, disseminated, and directly or indirectly executed. Computer viruses can be disguised as application programs, functions, macros, electronic mail attachments, and even applets and in hypertext links. Computer viruses travel between machines via infected media or over network connections disguised as legitimate files or messages.

The term "virus", as used herein, also refers to worms and any other types or configurations of malicious computer code. A worm typically may be an executable vandal file that can multiply if an unsuspecting user is tricked into opening it. Worms can increase the rate by which they spread by inserting commands into startup routines, such as AUTOEXEC.BAT. Other types of malicious computer code may include content threats, such as active content vandals, including ActiveX, Java, and script vandals.

Figure 1:
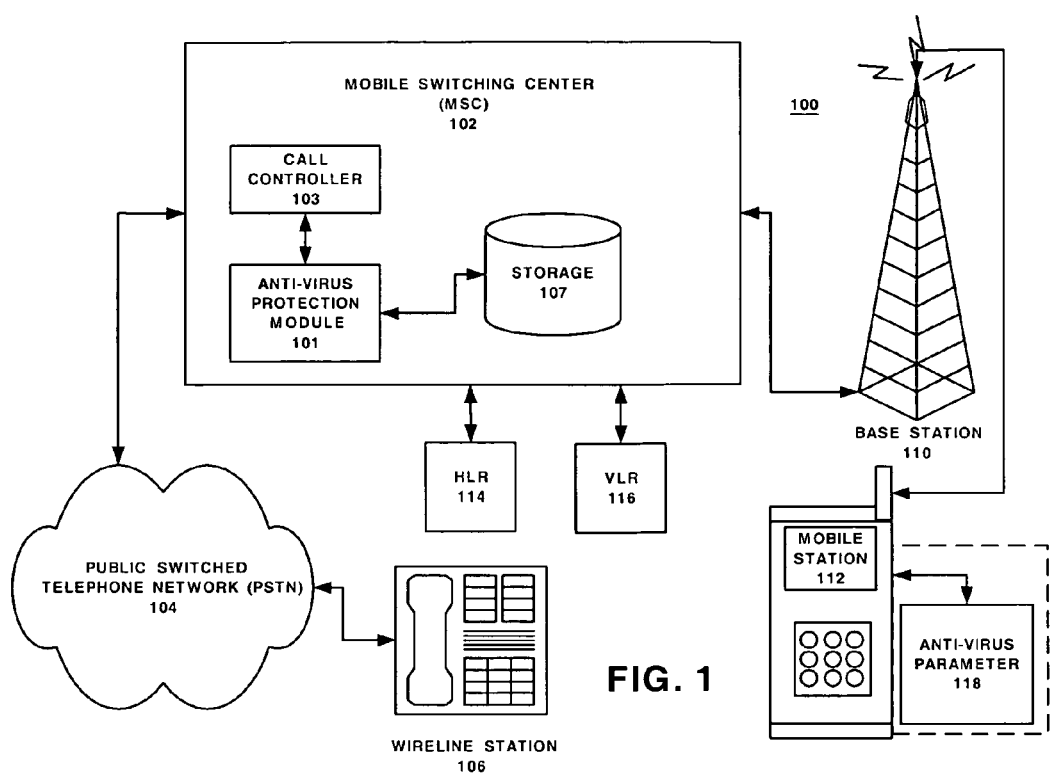
FIG. 1 depicts a block diagram illustrative of a mobile switching center, base station and mobile terminal for use with the present method and system.

Referring to FIG. 1, a system 100 is depicted for at least one mobile terminal of a plurality of mobile terminals operatively connected to a communication network. Although the present system and method may be used any type of system (wired and wireless, for example), the subscriber may typically be a mobile subscriber who uses a mobile terminal (also referred to as mobile phone, a cell phone, mobile handset, car phone). The system (or communication network) 100 may have a mobile switching center (MSC) 102. The system may be, or may be part of, one or more of a telephone network, a local area network ("LAN"), the Internet, and a wireless network. In the depicted embodiment, a public switched telephone network (PSTN) 104 is connected to the MSC 102. The PSTN 104 routes calls to and from mobile users through the MSC 102. The PSTN 104 also routes calls from and to wireline stations 106. The MSC 102 may also be connected to one or more base stations (BS) 110. Each of the base stations 110 communicates with mobile terminal(s) 112 in its service area. The PSTN 104 generally can be implemented as the world-wide voice telephone network accessible to all those with telephones and access privileges (e.g., AT&T long distance network).

Each of the mobile terminals 112 may have a home location register (HLR) 114 where data about each of the mobile terminals 112 resides. Some of the mobile terminals 112 may be remotely located from their home location, and in that case, a visiting location register (VLR) 116 is set up locally for each mobile terminal 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 may be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminal 112 may be implemented as a cellular device, personal communication device, short message service device or wireless communications device (e.g., a wireless personal digital assistant).

The MCS 102 may have, or be operatively connected to, components of a system for automatic anti-virus protection by a telecommunication network for mobile terminals. Such components in some embodiments may include: anti-virus protection module 101, call controller 103 and storage 107 (such as a subscriber database) in the MCS 102; and anti-virus parameter 118 that is formed in the mobile terminal 112.

Figure 2:
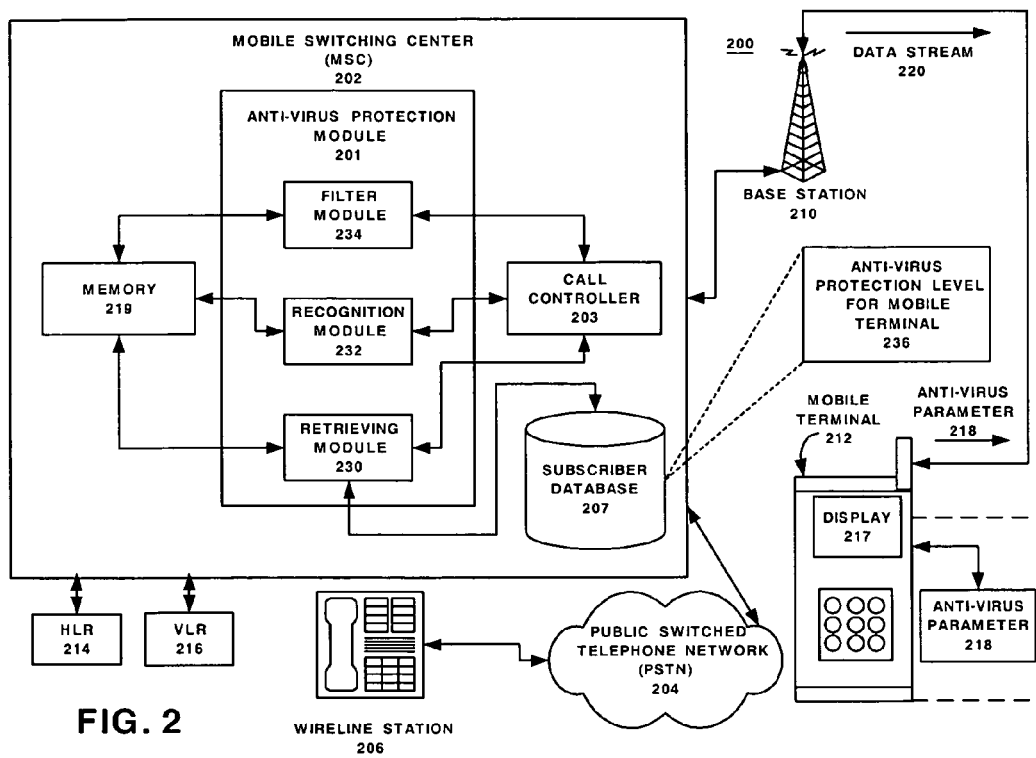
FIG. 2 illustrates a more detailed block diagram illustrative of a mobile switching center, base station, and mobile terminal according to one embodiment of the present method and system.

Referring to FIG. 2, a system (or telecommunication network) 200 is shown for at least one mobile terminal of a plurality of mobile terminals operatively connected to a communication network. FIG. 2 depicts a block diagram that is illustrative of a mobile switching center 202 operatively connected to PSTN 204, base station 210, and mobile terminal 212 according to one embodiment of the present method and system. The PSTN 204 routes calls to and from mobile users through the MSC 202, and also routes calls from and to wireline stations 206. The MSC 202 is connected to one or more base stations 210. The base station(s) 210 communicates through the air to mobile terminals 212, which may be of a cellular telephone type or of the wider bandwidth personal communication device type. Mobile terminals 212 may be wireless handsets or automobile mounted stations the same as those shown in FIG. 1. The MSC 202 has operatively connected thereto a VLR 216 and a HLR 214 that interface with the mobile terminal 212 as explained above.

One embodiment of the system for automatic anti-virus protection by a telecommunication network for mobile terminals may have the following elements.

At least one anti-virus parameter 218 is defined by a respective mobile terminal 212 of a plurality of mobile terminals. The anti-virus parameter 218 is communicated from the respective mobile terminal to the communication network 100. As depicted in FIG. 2, the anti-virus parameter 218 may be forwarded from the mobile switching center 202 by the base station 220. When the anti-virus parameter 218 is received by the mobile switching center 202, an indicator is set in the subscriber database that shows that the mobile terminal is a subscriber to the anti-virus protection feature. In the mobile switching center 202 a call controller 203 is operatively connected to anti-virus protection module 201. The anti-virus protection module 201 is also operatively connected to a subscriber database 207 and to a memory 219.

The system embodiment depicted in FIG. 2 has a mobile subscriber database 207 in the telecommunication network 200 in which is stored at least one anti-virus protection level 236 for at least one mobile terminal (such as mobile terminal 212). The anti-virus protection level 236 may include various virus protections and resulting actions, such as, a block action, a prompt action, and a pass action for files or software (data stream 220) sent to the mobile terminal 212. In one embodiment a call controller 203 in the telecommunication network 200 handles a call having a data stream, and implements a call setup for the call, the call being associated with the mobile terminal 212 and the call setup being initiated by the call controller 203. The anti-virus protection module 201 may have a retrieving module 230 operatively connected to the mobile subscriber database 207 and to the call controller 203, the retrieving module 230 retrieving the anti-virus protection level 236 from the mobile subscriber database 207 for the mobile terminal 212. The retrieving module 230 stores the retrieved anti-virus protection level 236 in the memory 219 as part of the call setup. A recognition module 232 is operatively connected to the call controller 203 and to the memory 219, the recognition module 232 using the retrieved anti-virus protection level 236 stored in the memory 219 to recognize a virus in the data stream 220 intended for the mobile terminal. A filter module 234 is operatively connected to the memory 219 and to the call controller 203. The filter module 234 filters the recognized virus from the data stream 220 before the data stream 220 arrives at the mobile terminal 212.

In one embodiment the subscriber database 207, for storing the at least one anti-virus protection level 236, may be configured with at least one of black lists, white lists, and individual levels of protection that are defined via the mobile terminal 212. A black list is a list of known malicious objects (websites, vandals, script commands, etc.) that should be blocked by default. A white list is a list of known objects (web sites, script commands, etc.) that should be allowed, while all other objects of the same type are blocked.

In a further embodiment the method may automatically send an alert to the mobile terminal 212 before passing on potentially harmful instructions to the mobile terminal 212. The alert may be sent from the telecommunication network 200 to the mobile terminal 212 via at least one of email, SMS, and data for display on a display 217 of the mobile terminal 212. Embodiments of the alert and the format for sending the alert may take many different forms in various embodiments of the present method and system.

Figure 3:
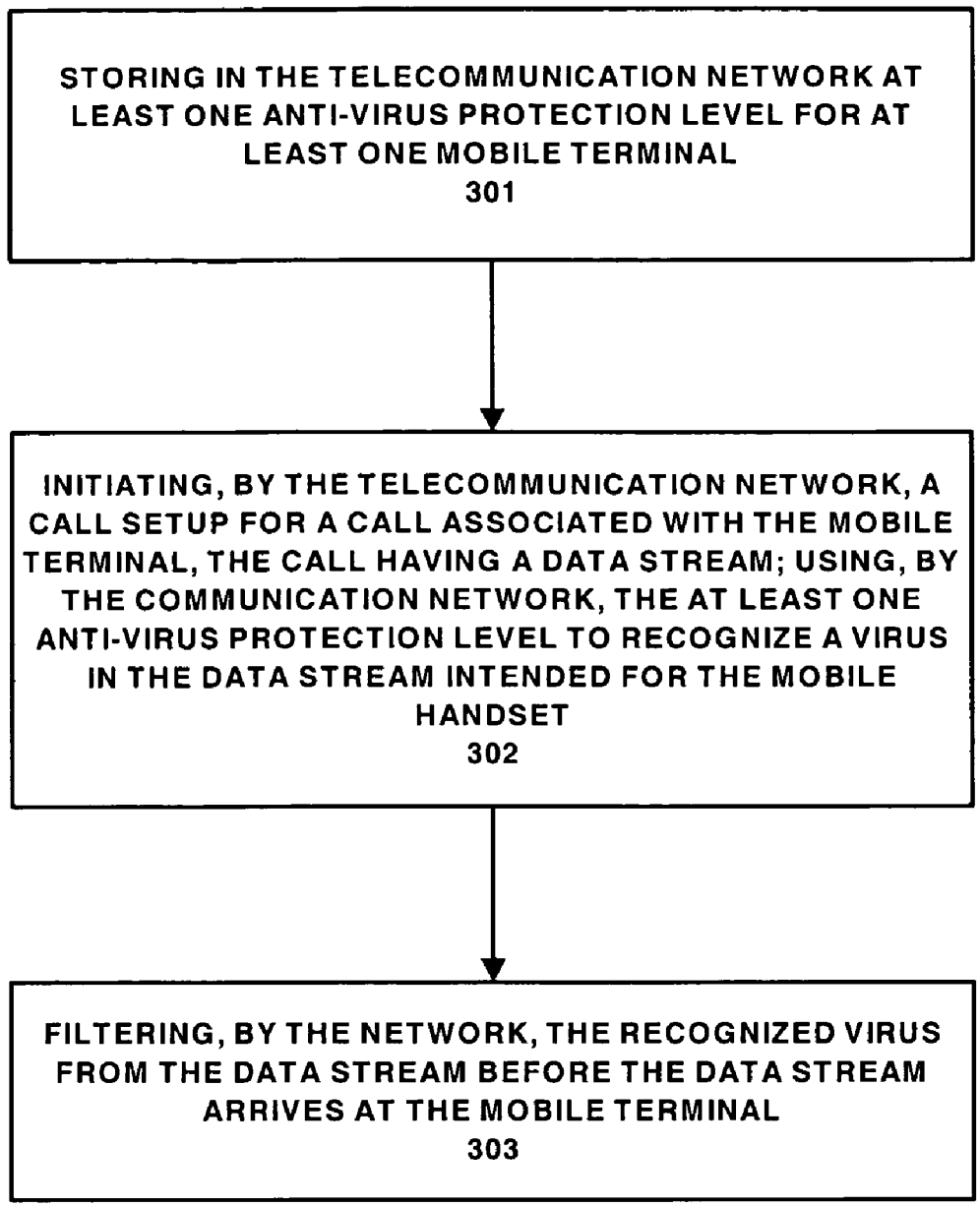
FIG. 3 illustrates a very general flow chart of logical operational steps that may be followed in accordance with one embodiment of the present method and system.

FIG. 3 is a general block diagram depicting an embodiment of the present method. In very general terms, the method has the steps of: storing in the telecommunication network at least one anti-virus protection level for at least one mobile terminal; initiating, by the telecommunication network, a call setup for a call associated with the mobile terminal, the call having a data stream (301); using, by the communication network, the at least one anti-virus protection level to recognize a virus in the data stream intended for the mobile terminal (302); and filtering, by the network, the recognized virus from the data stream before the data stream arrives at the mobile terminal (303).

Figure 4:
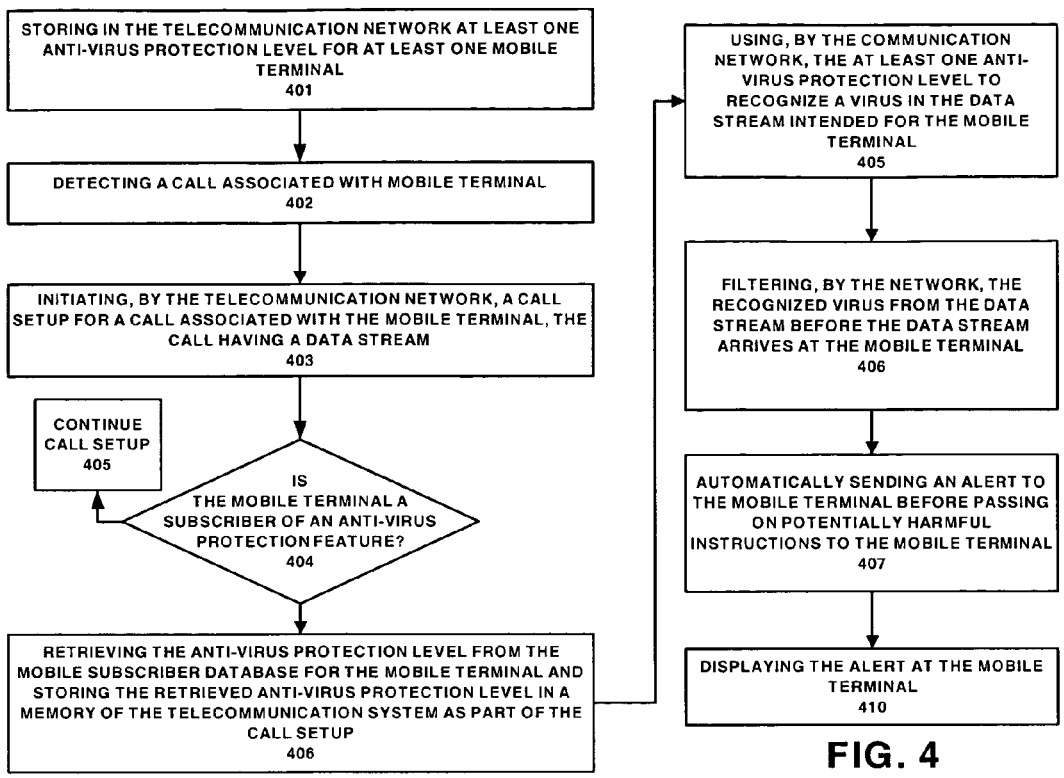
FIG. 4 illustrates another flow chart of logical operational steps that may be followed in accordance with one embodiment of the present method and system.

FIG. 4 is a block diagram depicting another embodiment of the present method. This embodiment of the method may have the steps of: storing in a mobile subscriber database in the telecommunication network at least one anti-virus protection level for at least one mobile terminal in the subscriber database (step 401); detecting a call associated with the mobile terminal (402); initiating, by the telecommunication network, a call setup for a call associated with the mobile terminal, the call having a data stream (403); determining if the mobile terminal is a subscriber of an anti-virus protection feature (step 404); if the mobile terminal is not a subscriber, the call setup is continued (step 405); retrieving the anti-virus protection level from the mobile subscriber database for the mobile terminal and storing the retrieved anti-virus protection level in a memory of the telecommunication system as part of the call setup (step 406); using, by the telecommunication network, the retrieved anti-virus protection level to recognize a virus in the data stream intended for the mobile handset (step 407); filtering, by the telecommunication network, the virus from the data stream before the data stream arrives at the mobile terminal (step 408); automatically sending an alert to the mobile terminal before passing on potentially harmful instructions to the mobile terminal (step 409); and displaying the alert at the mobile terminal (step 410).

Thus the improved method and system implements automatic anti-virus protection by a telecommunication network for mobile terminals. Embodiments of the present method and system overcome the drawbacks of the prior art by providing the necessary network support for insuring that data transmissions to mobile handsets contain no malicious instructions and by providing a warning message to a subscriber of the mobile terminal before allowing certain powerful capabilities to be automatically executed.

The present system and method may be used with non-mobile phones, as well as, mobile phones. Also, different types of data storage devices may be used with the present method and system. For example, a data storage device may be one or more of a magnetic, electrical, optical, biological, and atomic data storage medium.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance in all respects.

We claim:

1. A method for providing network support for a subscriber selected automatic anti-virus protection level to operate between an MSC and a handhold mobile terminal by a telecommunication network for mobile terminals, the method comprising the steps of:
    storing in the telecommunication network subscriber information for an anti-virus protection feature comprising at least one subscriber selected anti-virus protection level selected from a plurality of virus protection levels for at least one respective handheld mobile terminal of a plurality of handheld mobile terminals based on subscriber preference defined in an anti-virus feature;
    initiating, by the telecommunication network, a call setup for a call associated with the respective handheld mobile terminal, the call having a data stream;
    wherein at least one anti-virus parameter is defined by the respective handheld mobile terminal, wherein the anti-virus parameter is communicated from the respective handheld mobile terminal to the communication network, wherein the anti-virus parameter is forwarded to the mobile switching center, wherein when the anti-virus parameter is received by the mobile switching center, an indicator is set in the subscriber database that shows that the handheld mobile terminal is a subscriber to the anti-virus protection feature;
    retrieving the subscriber selected anti-virus protection level from the mobile subscriber database for the respective handheld mobile terminal if the mobile terminal is a subscriber of the anti-virus protection feature;
    using, by the communication network, the subscriber selected anti-virus protection level to recognize a virus in the data stream intended for the respective handheld mobile terminal based on the subscriber preference defined in the anti-virus feature; and
    filtering, via an anti-virus protection module operably connected to a call controller of an MSC of the network, the recognized virus from the data stream before the data stream arrives at the respective handheld mobile terminal;
    wherein a respective anti-virus protection level includes virus protections and resulting actions; and
    wherein the steps of storing, initiating, retrieving, using, and filtering are performed only in a mobile switching center in the telecommunication network.

2. The method of claim 1 wherein the method further comprises automatically sending an alert to the mobile terminal before passing on potentially harmful instructions to the mobile terminal 3. The method of claim 2 wherein the alert is sent from the telecommunication network to the mobile terminal via at least one of email, SMS, and data for display on the mobile terminal.

4. The method of claim 1 wherein the method further comprises, before initiating a call setup, checking if the mobile terminal is a subscriber of an anti-virus protection feature having the at least one anti-virus protection level.

5. The method of claim 4 wherein indication of the anti-virus protection feature for a mobile terminal is stored in a subscriber database.

6. The method of claim 1 wherein the anti-virus protection level comprises a block action, a prompt action, and a pass action.

7. The method of claim 1 wherein the subscriber database, for storing the at least one anti-virus protection level, is configured with at least one of black lists, white lists, and individual levels of protection that are defined via the mobile terminal.

8. A method for providing network support for a subscriber selected automatic anti-virus protection level by a telecommunication network for mobile terminals, the method comprising the steps of:
    storing in a mobile subscriber database in the telecommunication network subscriber information for an anti-virus protection feature comprising a subscriber selected anti-virus protection level of a plurality of virus protection levels for at least one respective handheld mobile terminal of a plurality of handheld mobile terminals based on subscriber preference defined in an anti-virus feature;
    initiating, by the telecommunication network, a call setup for a call associated with the handhold mobile terminal, the call having a data stream;
    wherein at least one anti-virus parameter is defined by the handheld respective mobile terminal, wherein the anti-virus parameter is communicated from the respective handheld mobile terminal to the communication network, wherein the anti-virus parameter is forwarded to the mobile switching center, wherein when the anti-virus parameter is received by the mobile switching center, an indicator is set in the subscriber database that shows that the handheld mobile terminal is a subscriber to the anti-virus protection feature;
    retrieving the subscriber selected and-virus protection level from the mobile subscriber HLR database for the respective handheld mobile terminal and storing the retrieved anti-virus protection level in a memory of the telecommunication system as part of the call setup if the mobile terminal is a subscriber of the anti-virus protection feature;
    using, by the telecommunication network, the retrieved anti-virus protection level to recognize a virus in the data stream via an antivirus protection module operably connected to a call controller of an MSC of the network, the recognized virus from the data stream intended for the respective handheld mobile terminal based on the subscriber preference defined in the anti-virus feature; and
    filtering, by the telecommunication network, the virus from the data stream before the data stream arrives at the respective handheld mobile terminal;
    wherein a respective anti-virus protection level includes virus protections and resulting actions; and
    wherein the steps of storing, initiating, retrieving, using, and filtering are performed only in a mobile switching center in the telecommunication network.

9. The method of claim 8 wherein the method further comprises automatically sending an alert to the mobile terminal before passing on potentially harmful instructions to the mobile terminal.

10. The method of claim 9 wherein the alert is sent from the telecommunication network to the mobile terminal via at least one of email, SMS, and data for display on the mobile terminal.

11. The method of claim 8 wherein the method further comprises, before initiating a call setup, checking if the mobile terminal is a subscriber of an anti-virus protection feature having the at least one anti-virus protection level.

12. The method of claim 11 wherein indication of the anti-virus protection feature for a mobile terminal is stored in a subscriber database.

13. The method of claim 8 wherein the anti-virus protection level comprises a block action, a prompt action, and a pass action.

14. The method of claim 8 wherein the subscriber database, for storing the at least one anti-virus protection level, is configured with at least one of black lists, white lists, and individual levels of protection that are defined via the mobile terminal.

15. A system that provides network support for automatic subscriber selected anti-virus protection levels by a telecommunication network for mobile terminals, the system comprising:
- a HLR mobile subscriber database in the telecommunication network in which is stored subscriber information for an anti-virus protection feature comprising a subscriber selected anti-virus protection level selected from a plurality of virus protection levels for at least one respective mobile terminal of a plurality of mobile terminals in the subscriber database based on subscriber preference defined in an anti-virus feature;
- a call controller in the telecommunication network that handles a call having a data stream, and that implements a call setup for the call, the call being associated with the respective mobile terminal, the call setup being initiated by the call controller;
- wherein at least one anti-virus parameter is defined by the respective mobile terminal, wherein the anti-virus parameter is communicated from the respective mobile terminal to the communication network, wherein the anti-virus parameter is forwarded to the mobile switching center, wherein when the anti-virus parameter is received by the mobile switching center, an indicator is set in the subscriber database that shows that the mobile terminal is a subscriber to the anti-virus protection feature of the subscriber selected anti-virus protection level;
- a retrieving module in the telecommunication network operatively connected to the mobile subscriber database and to the call controller, the retrieving module retrieving the subscriber selected anti-virus protection level from the mobile subscriber database for the respective mobile terminal and storing the retrieved anti-virus protection level in a memory of the telecommunication system as part of the call setup if the mobile terminal is a subscriber of the anti-virus protection feature;
- a recognition module in the telecommunication network operatively connected to the call controller and to the memory, the recognition module using the retrieved anti-virus protection level stored in the memory to recognize a virus in the data stream via an antivirus protection module operably connected to a call controller of an MSC of the network, the recognized virus from the data stream intended for the respective mobile terminal based on the subscriber preference defined in the anti-virus feature; and
- a filter module in the telecommunication network operatively connected to the memory and to the call controller, the filter module filtering the recognized virus from the data stream before the data stream arrives at the respective mobile terminal based on the subscriber preference defined in the anti-virus feature;
- wherein the subscriber selected anti-virus protection level includes virus protections and resulting actions; and
- wherein the mobile subscriber database, the call controller, recognition module, the retrieving module, and the filter module axe located only in a mobile switching center in the telecommunication network.

16. The system of claim 1 wherein indication of an anti-virus protection feature having the at least one anti-virus protection level for a mobile terminal is stored in the subscriber database.

17. The method of claim 1 wherein the anti-virus protection level comprises a block action, a prompt action, and a pass action.

18. The method of claim 1 wherein the subscriber database, for storing the at least one anti-virus protection level, is configured with at least one of black lists, white lists, and individual levels of protection that are defined via the mobile terminal.

\* \* \* \* \*